United States Patent
Lin

(10) Patent No.: US 9,842,064 B2
(45) Date of Patent: Dec. 12, 2017

(54) ELECTRONIC APPARATUS AND MANAGEMENT METHOD THEREOF

(71) Applicant: MStar Semiconductor, Inc., Hsinchu Hsien (TW)

(72) Inventor: Jun-You Lin, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 100 days.

(21) Appl. No.: 14/840,362

(22) Filed: Aug. 31, 2015

(65) Prior Publication Data

US 2016/0070657 A1  Mar. 10, 2016

(30) Foreign Application Priority Data

Sep. 4, 2014  (TW) ............... 103130546 A

(51) Int. Cl.
*G06F 12/14* (2006.01)
*G06F 17/30* (2006.01)
*G06F 21/79* (2013.01)

(52) U.S. Cl.
CPC .... *G06F 12/1433* (2013.01); *G06F 17/30091* (2013.01); *G06F 17/30312* (2013.01); *G06F 17/30342* (2013.01); *G06F 17/30365* (2013.01); *G06F 21/79* (2013.01); *G06F 12/1441* (2013.01); *G06F 2212/1052* (2013.01)

(58) Field of Classification Search
CPC .... G06F 3/0619; G06F 3/064; G06F 11/3466; G06F 3/0683; G06F 11/1608; G06F 12/023; G06F 17/30138; G06F 2201/86; G06F 11/16; G06F 11/3438; G06F 11/3476; G06F 11/073; G06F 11/22; G06F 11/3433; G06F 17/30091; G06F 17/30312; G06F 12/1433; G06F 2212/1052; G06F 17/30342; G06F 17/30365; G06F 21/79; G06F 12/1441
See application file for complete search history.

(56) References Cited

U.S. PATENT DOCUMENTS

| | | | |
|---|---|---|---|
| 6,587,463 B1 * | 7/2003 | Hebb .................. | H04L 47/10 370/392 |
| 7,757,101 B2 * | 7/2010 | Nonaka ................ | G06F 21/10 705/51 |
| 2010/0235499 A1 * | 9/2010 | Maki .................... | H04L 43/028 709/224 |
| 2011/0145536 A1 * | 6/2011 | Zachmann ........ | G06F 11/0751 711/171 |

(Continued)

*Primary Examiner* — Phung M Chung
(74) *Attorney, Agent, or Firm* — Edell, Shapiro & Finnan, LLC

(57) ABSTRACT

An electronic apparatus operating with a memory includes an operating module, a management module, a database and a filtering module. When the operating module needs to use the memory for performing a task, the operating module issues a memory request. The management module determines whether the memory request is to be permitted. When the memory request is permitted, the management module generates a requested data chunk according to the memory request. The filtering module receives the requested data chunk from the management module, and determines whether to store the requested data chunk into the data base according to a predetermined filtering condition.

15 Claims, 4 Drawing Sheets

(56) References Cited

U.S. PATENT DOCUMENTS

| | | | | |
|---|---|---|---|---|
| 2012/0054747 A1* | 3/2012 | Waldspurger | ........... | G06F 9/545 |
| | | | | 718/1 |
| 2014/0085501 A1* | 3/2014 | Tran | ................... | H04N 5/23238 |
| | | | | 348/222.1 |
| 2014/0300758 A1* | 10/2014 | Tran | ....................... | H04N 5/225 |
| | | | | 348/207.1 |
| 2014/0359363 A1* | 12/2014 | Biem | .................. | G06F 11/3024 |
| | | | | 714/37 |

* cited by examiner

1
ELECTRONIC APPARATUS AND MANAGEMENT METHOD THEREOF

This application claims the benefit of Taiwan application Serial No. 103130546, filed Sep. 4, 2014, the subject matter of which is incorporated herein by reference.

BACKGROUND OF THE INVENTION

Field of the Invention

The invention relates to a memory management technology in an electronic apparatus.

Description of the Related Art

In various electronic apparatuses, more and more functions are achieved through software programs. To ensure normal operations of electronic products, manufacturers carry out test procedures before the products are shipped out of the factory, hoping to discover defects and hence debug the software programs in advance. For example, testing staff may intentionally perform an application program for an extended period of time to check whether the application program causes a memory leak issue that persistently and unreasonably occupies a memory space.

FIG. 1 shows a partial functional block diagram of a current electronic apparatus. When an operating module 11 of an application program that performs a certain task needs to use a memory 12, the operating module 11 issues a memory request to an application programming interface (API) 13. According to the size of a current available space of the memory 12, the API 13 determines whether the memory request is to be permitted. When the memory request is permitted, the API 13 correspondingly designates an available memory space to the operating module 11, and stores various information associated with this memory request into a database 14. The testing staff then determines whether the application program performed by the operating module 11 contains a defect associated with the memory 12 according to the information stored in the database 14.

In practice, there may be multiple application programs concurrently operating in the above electronic apparatus, and each of these application programs may concurrently perform multiple tasks. In current technologies, information associated with each memory request for accessing the memory 12 is loaded into the database 14. Thus, the amount of the information written into the database 14 is massive, and so the database 14 is required to have an extremely large capacity. Further, most current electronic apparatuses are designed to only allow the retrieval of data from the database for further analysis once an overall operation has ended. Such design with inadequate time validity prohibits the testing staff from real-time discovering defects in the application programs. In addition, bulky amounts of information accumulated over a period of time needs to be processed each time the analysis is performed.

SUMMARY OF THE INVENTION

To solve the above issues, the present invention provides an electronic apparatus and a management method thereof. By adopting an appropriate filtering mechanism, memory access information stored into a database can be significantly reduced to save the capacity of the database required. Further, the electronic apparatus and the management method of the present invention provide an auto-monitoring function to enhance the efficiency of a testing procedure. The concept of the present invention is applicable to various electronic apparatuses that require a memory.

An electronic apparatus operating with a memory is provided according to an embodiment of the present invention. The electronic apparatus includes an operating module, a management module, a database and a filtering module. When the operating module needs to access the memory for performing a task, the operating module issues a memory request. The management module determines whether the memory request is to be permitted. When the memory request is permitted, the management module generates a requested data chunk according to the memory request. The filtering module receives the requested data chunk from the management module, and determines whether to store the requested data chunk into the database according to a predetermined filtering condition.

A management method applied to an electronic apparatus is provided according to another embodiment of the present invention. The electronic apparatus includes a database and operates with a memory. The management method includes: receiving a memory request for accessing the memory, wherein the memory request is associated with a task; determining whether the memory request is to be permitted; generating a requested data chunk according to the memory request when the memory request is permitted; and determining whether to store the requested data chunk into the database according to a predetermined filtering condition.

The above and other aspects of the invention will become better understood with regard to the following detailed description of the preferred but non-limiting embodiments. The following description is made with reference to the accompanying drawings.

Figure 1:
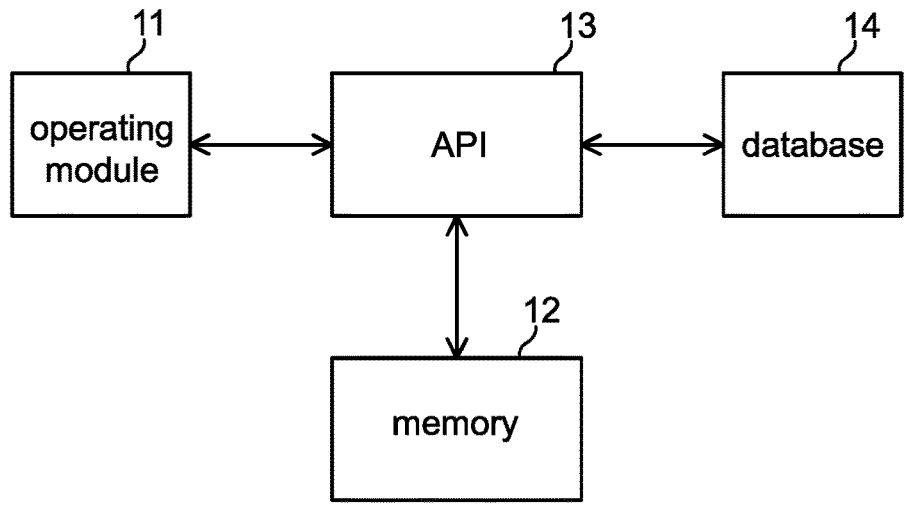
FIG. 1 is a partial functional block diagram of a current electronic apparatus.

It should be noted that, the drawings of the present invention include functional block diagrams of multiple functional modules related to one another. These drawings are not detailed circuit diagrams, and connection lines therein are for indicating signal flows only. The interactions between the functional elements/or processes are not necessarily achieved through direct electrical connections. Further, functions of the individual elements are not necessarily distributed as depicted in the drawings, and separate blocks are not necessarily implemented by separate electronic elements.

DETAILED DESCRIPTION OF THE INVENTION

Figure 2:
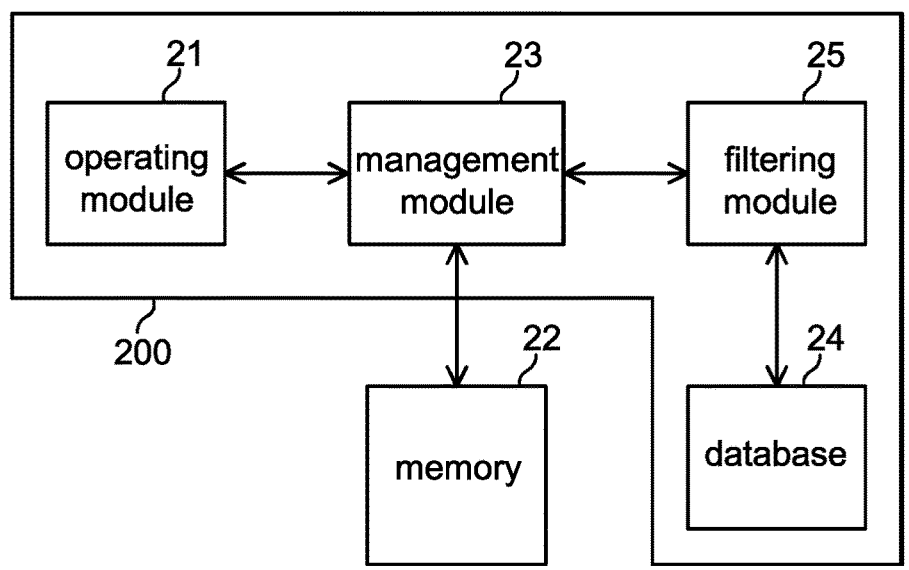
FIG. 2 is a functional block diagram of an electronic apparatus according to an embodiment of the present invention.

FIG. 2 shows a functional block diagram of an electronic apparatus according to an embodiment of the present invention. An electronic apparatus 200 includes an operating module 21, a management module 23, a database 24 and a filtering module 25. The electronic apparatus 200 operates with a memory 22. In practice, the electronic apparatus 200 can be applied to various electronic apparatuses equipped with a memory, e.g., mobile phones, personal computers and household appliances, but is not limited thereto. Further, the scope of the present invention does not limit the type of storage mechanism. For example, the memory 22 may include one or multiple volatile or non-volatile memory devices, e.g., random access memories (RAMs), magnetic and/or optic memories, or flash memories.

When the operating module 21 needs to access the memory 22 for performing a task, the operating module 21 issues a memory request. The management module 23 determines whether to permit the memory request according to a current available space of the memory 22. When the memory request is permitted, in addition to returning a request permission to the operating module 21, the management module 23 further generates a requested data chunk according to the memory request. For example, the requested data chunk may include one or multiple of following messages: identify information corresponding to the task for the memory request, a memory address the management module 23 designates to the memory request, and a memory usage amount permitted for the memory request. In practice, the management module 23 may be implemented by multiple control/processing platforms, including fixed and programmable logic circuits, e.g., programmable logic gate arrays, application-specific integrated circuits (ASICs), microcontrollers, microprocessors, and digital signal processors (DSPs). In one embodiment, a memory application program interface (API) for communicating with the memory 22 is included in the management module 23.

The filtering module 25 receives the requested data chunk from the management module 23, and determines whether to store the requested data chunk into the database 24 according to a predetermined filtering condition. In one embodiment, the predetermined filtering condition adopted by the filtering module 25 includes a predetermined time interval. In other words, the filtering module 25 is configured to store a requested data chunk of a memory request that is issued within one predetermined time interval or multiple time intervals. In another embodiment, the filtering module 25 may be configured to only allow the database 24 to store a requested data chunk having a designated memory address that falls within one predetermined address interval or multiple address intervals. In another embodiment, the predetermined filtering conditions adopted by the filtering module 25 include identity information of a task. In other words, the filtering module 25 may be configured to only allow the database 24 to store a requested data chunk associated with one task or multiple tasks.

It should be noted that, the above predetermined filtering conditions may be selected by testing staff according to actual requirements. Different from the prior art in which a database directly receives a massive amount of non-filtered information, the database 24 stores filtered information required for actual tests. Thus, the capacity of the database 24 of the present invention can be appropriately reduced to save hardware costs of the electronic apparatus 200.

Figure 3:
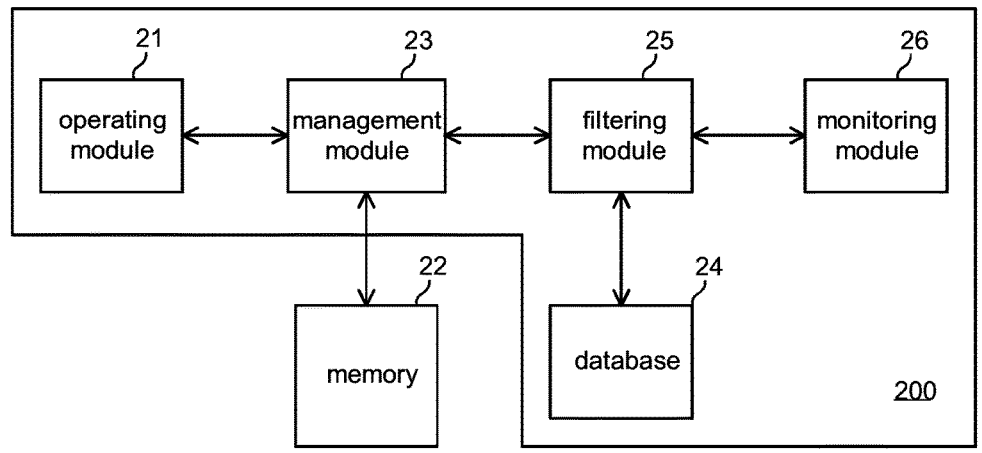
FIG. 3 is an electronic apparatus further including a monitoring module according to an embodiment of the present invention.

In one embodiment, a plurality of requested data chunks stored in the database 24 are sorted according to task identity information, a memory address or a memory usage amount. Appropriately sorting the requested data chunks helps testing staff to more conveniently retrieve the information. Referring to FIG. 3, the electronic apparatus 200 may further include a monitoring module 26. The monitoring module 26 communicates with the database 24 through the filtering module 25 to monitor the plurality of requested data chunks stored in the database 24. When the plurality of requested data chunks display an abnormal condition, the monitoring module 26 may immediately generate an abnormality report to inform the testing staff. For example, the abnormality condition may include a memory leak issue existing in a task. It should be noted that, details for determining a memory leak issue are known to one person ordinary skilled in the art, and shall be omitted herein. In another embodiment, the monitoring module 26 is directly coupled to the database 24.

Figure 4:
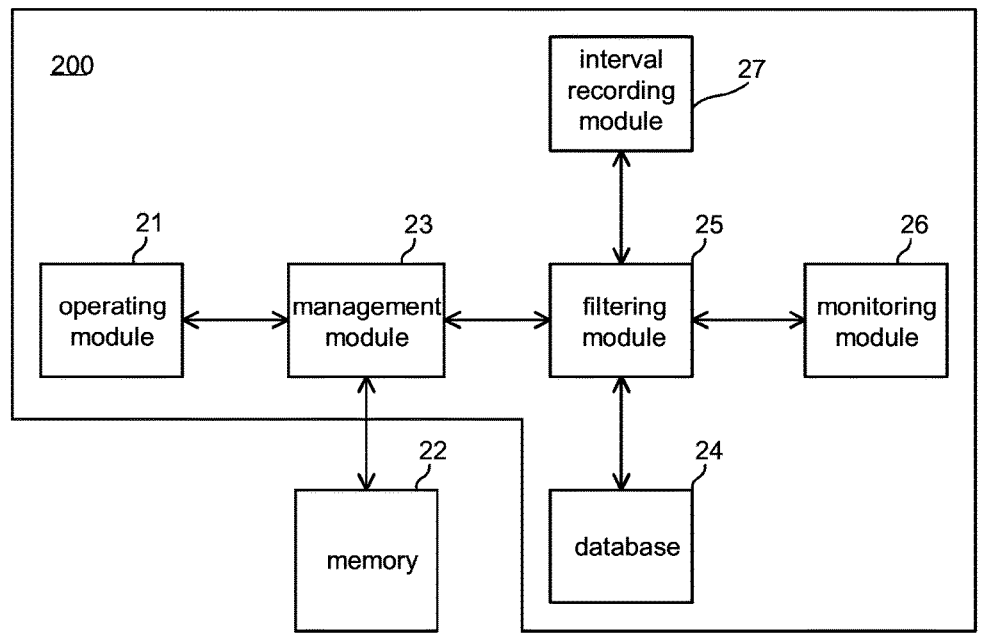
FIG. 4 is an electronic apparatus further including an interval recording module according to an embodiment of the present invention.

Referring to FIG. 4, the electronic apparatus 200 may further include an interval recording module 27. The interval recording module 27 may be an independent module or may be integrated in the database 24. A recording interval adopted by the interval recording module 27 may be a time interval or a memory address interval. In the description below, a memory address interval is used as an example. In an auto operation mode, the filtering module 25 updates a record in the interval recording module 27 each time a new requested data chunk is stored into the database 24, such that the interval recording module 27 records interval information corresponding to the newly stored requested data chunk (i.e., the memory address interval designated to the memory request). Thus, the interval recording module 27 records the memory address intervals corresponding to all of the requested data chunks stored in the database 24. By retrieving the records from the interval recording module 27, the monitoring module 26 analyzes the utilization of the memory 22. In a manual operation mode, the memory address intervals covered by the records in the interval recording module 27 are set by testing staff. When a new requested data chunk is stored into the database, the filtering module 25 determines whether a memory address interval corresponding to the requested data chunk falls within the memory address interval the testing staff sets in the interval recording module 27. If so, the interval recording module 27 updates the records in the database 24 and/or the interval recording module 27 according to the requested data chunk. If not, the interval recording module 27 does not load the requested data chunk into the database 24 and/or the interval recording module 27. In practice, testing staff may set the recording interval adopted by the interval recording module 27 via the filtering module 25.

Figure 5:
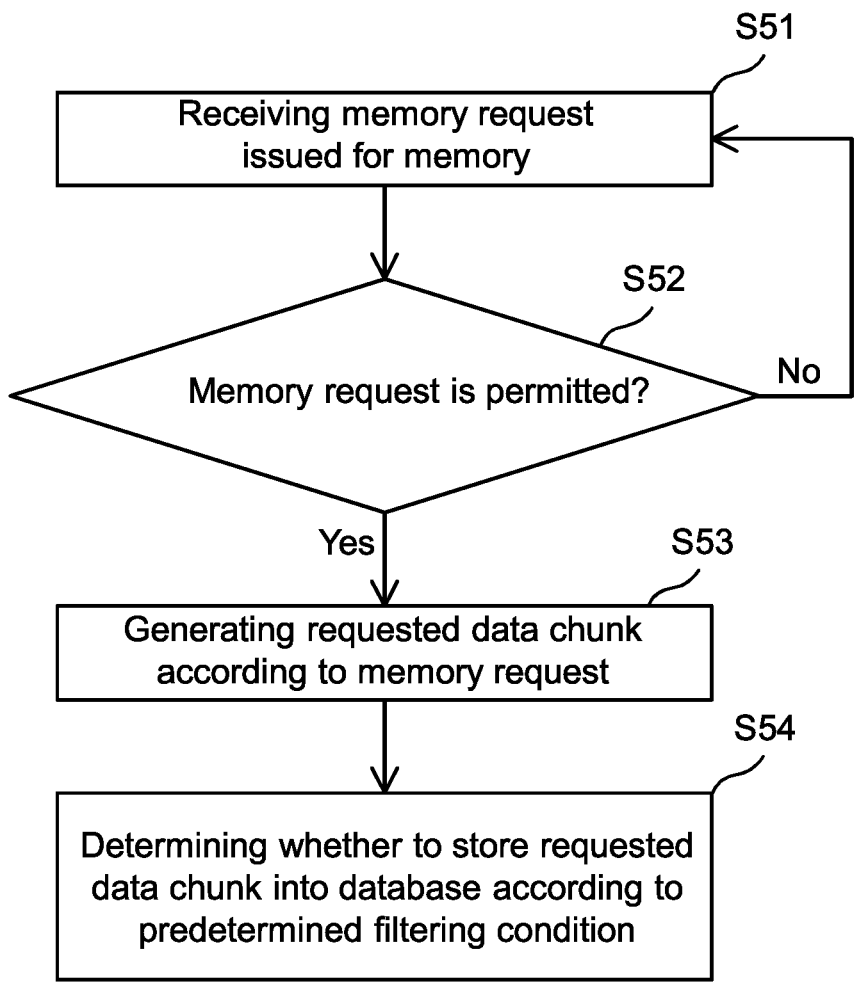
FIG. 5 is a flowchart of a management method according to an embodiment of the present invention.

FIG. 5 shows a flowchart of a management method applied to an electronic apparatus according to another embodiment of the present invention. The electronic apparatus includes a database, and operates with a memory. The management method includes following steps. In step S51, a memory request for accessing the memory is issued, wherein the memory request is associated with a task. In step S52, it is determined whether the memory request is to be permitted. Step S51 is iterated when the memory request is not permitted. When the memory request is permitted, in step S53, a requested data chunk is generated according to the memory request. In step S54, it is determined whether to store the requested data chunk into the database according to a predetermined filtering condition.

Figure 6:
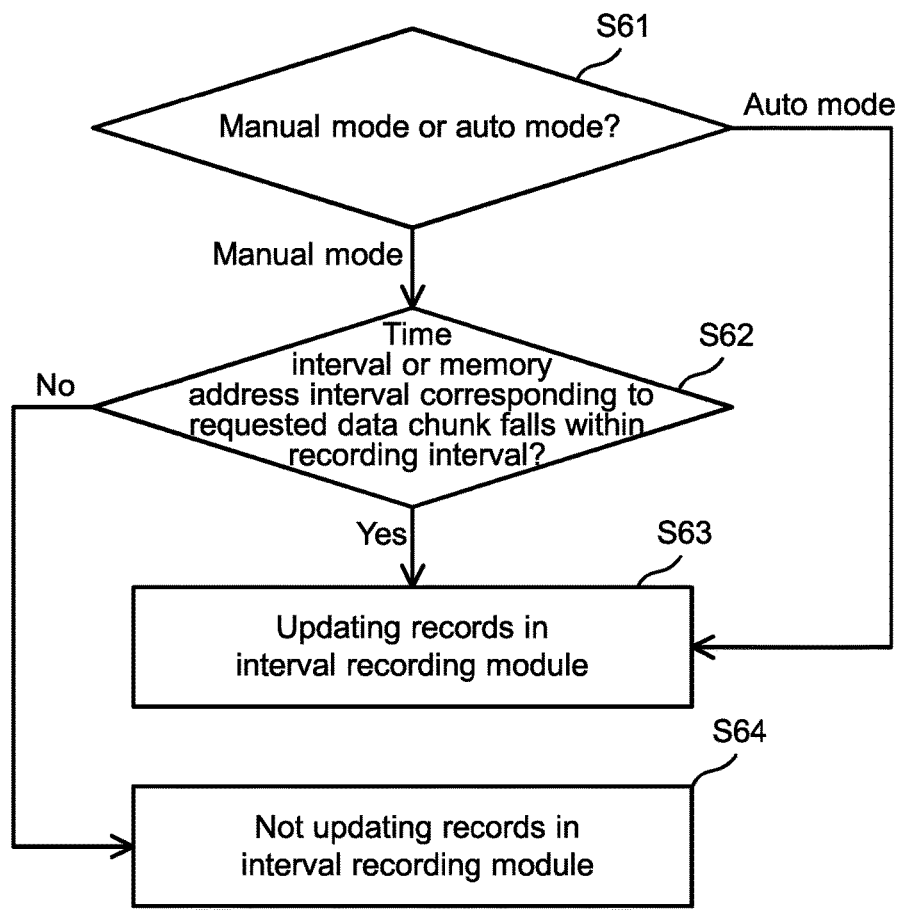
FIG. 6 is an example of a process subsequently implemented in cooperation with the management method in FIG. 5.

FIG. 6 shows an example of a process subsequently implemented in cooperation with the management method in FIG. 5. Step S61 may be performed after step S53 in FIG. 5 to determine whether an interval recording module of the electronic apparatus is currently in a manual mode or an auto mode. When the determination result in step S61 indicates an auto mode, step S63 is performed to update a record in the interval recording module according to a time interval or a memory address interval corresponding to the requested data chunk. When the determination result in step S61 indicates a manual mode, step S62 is performed to further determine whether a time interval or a memory address interval corresponding to the requested data chunk falls within a recording interval set for the interval recording interval. When the determination result of step S62 is affirmative, step S63 is performed. When the determination result of step S62 is negative, in step S64, the record in the interval recording module is not updated.

One person having ordinary skill in the art can understand that various operation modifications in the description associated with the electronic apparatus 200 may be applied to the management method in FIG. 5, and such details shall be omitted herein.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic apparatus, comprising:
    a memory;
    an operating module for an application, executing on the electronic apparatus, configured to issue a memory request to use the memory for performing a task for the application;
    a management circuit that receives the memory request, determines whether the memory request is to be permitted according to a current available space of the memory, returns a request permission to the operating module of the application, and generates a requested data chunk, according to the memory request, when the memory request is permitted;
    a database in communication with the management circuit; and
    a filtering module, in communication with the database, configured to receive the requested data chunk from the management circuit, and to determine whether to store the requested data chunk into the database according to a predetermined filtering condition.

2. The electronic apparatus according to claim 1, wherein the requested data chunk comprises at least one of identity information of the task, a memory address the management circuit designates to the memory request, and a memory usage amount.

3. The electronic apparatus according to claim 1, wherein a plurality of requested data chunks in the database are sorted according to task identity information, a memory address or a memory usage amount.

4. The electronic apparatus according to claim 1, wherein the predetermined filtering condition comprises at least one of a predetermined time interval and a predetermined memory address interval.

5. The electronic apparatus according to claim 1, further comprising:
    a monitoring module, configured to monitor a plurality of requested data chunks stored in the database, and to generate an abnormality report when the plurality of requested data chunks indicate an abnormal condition.

6. The electronic apparatus according to claim 5, wherein the abnormal condition comprises a memory leak issue existing in the task.

7. The electronic apparatus according to claim 1, further comprising:
    an interval recording module, configured to record interval information of all of the requested data chunks the database stores within one of a time interval and a memory address interval;
    wherein, in a manual mode, the time interval and the memory address interval are set by a testing staff, and the interval information is a memory address designated to the memory request.

8. A management method, applied to an electronic apparatus comprising a database and operating with a memory, the management method comprising:
    a) receiving a memory request for accessing the memory, wherein the memory request is associated with a task for an application executing on the electronic apparatus;
    b) determining whether the memory request is to be permitted and returning a request permission when the memory request is permitted according to a current available space of the memory;
    c) generating a requested data chunk according to the memory request when the memory request is permitted;
    d) determining whether to store the requested data chunk into the database according to a predetermined filtering condition; and
    e) when the predetermined filtering condition is met, storing the requested data chunk into the database.

9. The management method according to claim 8, wherein the requested data chunk comprises at least one of identity information of the task, a memory address the management module designates to the memory request, and a memory usage amount.

10. The management method according to claim 8, further comprising:
    sorting a plurality of requested data chunks in the database according to task information, a memory address or a memory usage amount.

11. The management method according to claim 8, wherein the predetermined filtering condition comprises one of a predetermined time interval and a predetermined memory address interval.

12. The management method according to claim 8, further comprising:
    in a manual operation mode, setting a recording interval that is a time interval or a memory address interval; and
    when a time interval or a memory address interval corresponding to the requested data chunk falls within the recording interval, updating records in at least one of the database and an interval recording module;
    wherein, the interval recording module records interval information corresponding to the requested data chunk, and the interval information is a memory address designated to the memory request.

13. The management method according to claim 8, further comprising:
    in an auto operation module, recording, by an interval recording module, interval information corresponding to the requested data chunk, wherein the interval information is a memory address designated to the memory request.

14. The management method according to claim 8, further comprising:
    monitoring a plurality of requested data chunks stored in the database; and
    generating an abnormality report when the plurality of requested data chunks display an abnormal condition.

15. The management method according to claim 14, wherein the abnormal condition comprises a memory leak issue existing in the task.

\* \* \* \* \*